United States Patent [19]

Tusim et al.

[11] Patent Number: 5,006,565
[45] Date of Patent: Apr. 9, 1991

[54] ANTI-CLUMPING AGENTS FOR EXPANDABLE VINYLAROMATIC-ACRYLONITRILE POLYMERIC MATERIALS

[75] Inventors: Martin H. Tusim; James T. Grimes, both of Newark, Ohio

[73] Assignee: The Dow Chemical Company, Midland, Mich.

[21] Appl. No.: 516,020

[22] Filed: Apr. 27, 1990

[51] Int. Cl.$^5$ ............................................. C08V 9/224
[52] U.S. Cl. ........................................ 521/57; 521/56; 521/60; 521/147
[58] Field of Search ..................... 521/57, 60, 56, 147; 427/222

[56] References Cited

U.S. PATENT DOCUMENTS

| 4,218,511 | 8/1980 | Hahn | 521/57 |
| 4,495,224 | 1/1985 | Rigler | 521/57 |
| 4,608,394 | 8/1986 | Ingram | 521/57 |
| 4,681,779 | 7/1987 | Ingram | 521/57 |

Primary Examiner—Morton Foelak

[57] ABSTRACT

The clumping together of expandable vinylaromatic-acrylonitrile copolymer particles during expansion of such particles is substantially completely reduced by coating the unexpanded virgin particles with from 0.2 to 1.5 weight percent, based on weight of expandable copolymer particles, of particulate magnesium oxide.

10 Claims, No Drawings

ANTI-CLUMPING AGENTS FOR EXPANDABLE VINYLAROMATIC-ACRYLONITRILE POLYMERIC MATERIALS

The present invention relates to coatings for expandable, that is, foamable polymers, especially vinylaromatic-acrylonitrile polymers. Expandable polymers are formed by compounding polymers, such as thermoplastic vinylaromatic polymers and copolymers, with a blowing agent.

Expandable thermoplastic resin compositions containing a volatile blowing agent are well known. When exposed to heat, the resin expands as the blowing agent expands. The expandable compositions are available in various forms, including a variety of particle sizes and shapes known generally as expandable beads. Among the most common expandable polymer beads currently available commercially are beads formed by blending a vinylaromatic polymer, such as a styrene-based polymer, with a blowing agent. Such expandable beads are widely used in manufacturing products such as hot- and cold-drink cups, toys, novelties, displays, ceiling tiles, ice chests, insulation board and block for construction, flotation devices, refrigerator components and packaging, including loose fill packing materials.

In forming loose fill packing materials, the unexpanded virgin beads which typically have a density of 35 to 75 pounds per cubic feet are expanded in a rotating steam chamber to a final density in the range from about 0.1 to 0.5 pounds per cubic feet, undergoing a volumetric expansion of 120 to 200 times the original volume of the virgin unexpanded beads. Typically, the beads are expanded through four passes or cycles through the steam chamber, with the incrementally-expanded beads being allowed to cool between passes to permit evaporation of surface moisture and allow the partial internal vacuum in the beads to equalize. Because the individual beads will soften and coalesce, that is, fuse, together during the expansion, it is necessary to provide the expandable beads with a protective coating to inhibit the natural fusion of the beads into a solid mass. Those skilled in the art have used calcium stearate powder to coat polystyrene beads and prevent them from clumping or fusing together in the expansion chamber.

The calcium stearate-coated expandable polystyrene beads do form excellent loose fill packing materials when fully expanded. Notwithstanding, the replacement of expandable polystyrene beads with expandable vinylaromatic-acrylonitrile copolymer beads has been vigorously investigated, because of the lower density and more rapid expansion rate of the vinylaromatic-acrylonitrile copolymer beads. For example, expandable styrene-acrylonitrile copolymer beads typically require a shorter exposure at the same expansion conditions than do polystyrene beads to attain the same volumetric expansion. Subject to the same clumping or fusion problem that is characteristic of all expandable thermoplastic resin beads, attempts to coat the copolymer beads with the same substances, such as calcium stearate, which are effective anti-clump o anti-fusion coatings for polystyrene have not been entirely satisfactory. There is a tendency for expandable styrene-acrylonitrile copolymer beads to clump in the steam chamber in spite of the calcium stearate coating. A need exists for a separation agent coating for expandable styrene-acrylonitrile polymeric beads so one can take advantage of the desirable properties of foamed styrene-acrylonitrile materials.

SUMMARY OF THE INVENTION

The present invention is based on the surprising discovery that magnesium oxide at from 0.2 to 1.5 percent, most preferably from 0.2 to 0.6 percent by weight based on bead weight, provides an exceptional separation agent for vinylaromatic-acrylonitrile copolymer beads. These and other objects, advantages and features of the invention will be more fully understood and appreciated by reference to the written specification.

DESCRIPTION OF THE PREFERRED EMBODIMENT

In the preferred embodiment of the invention, the clumping or fusion of expandable vinylaromatic-acrylonitrile copolymer beads, especially styrene-acrylonitrile copolymer (SAN) beads, is significantly reduced, if not entirely eliminated, by providing the virgin expandable beads with a separation agent system comprising a coating comprising magnesium oxide. Preferably, there is an intermediate coating comprising at least one binding agent between the magnesium oxide coating and the expandable polymeric beads which is effective to enhance adhesion of the magnesium oxide coating to the expandable polymeric beads. The coating of magnesium oxide powder surprisingly renders the expandable vinylaromatic-acrylonitrile copolymer beads significantly less susceptible to clumping or fusion in the expansion chamber and, with the binding agent, provides the fully-expanded loose fill packing with mild antistatic property.

The expandable vinylaromatic-acrylonitrile copolymer beads are prepared from a monomer mixture containing at least 50 weight percent of at least one vinylaromatic monomer and from 15 to 50, preferably 20 to 40 and most preferably 22 to 33 weight percent of acrylonitrile. The expandable copolymer beads will have incorporated therein from 1 to 25 weight percent of at least one blowing agent. The blowing agent can be introduced into the copolymer material during its polymerization or it can be added subsequently to a melt of virgin copolymer material.

Vinylaromatic monomers which are employed in forming the expandable vinylaromatic-acrylonitrile copolymers of the present invention have the formula $CH_2=CX-Ar$, wherein Ar is an aromatic radical, including various alkyl and halo-ring-substituted aromatic units of from 6 to 10 carbon atoms and X is hydrogen or an alkyl group having from 1 to 4 carbon atoms. Representative vinylaromatic monomers include styrene, o-methylstyrene, m-methylstyrene, p-methylstyrene, ethylstyrene, dimethylstyrene, alpha-methylstyrene, p-methoxystyrene, p-chlorostyrene, 2, 4-dichlorostyrene, 2, 5-dichlorostyrene, p-bromostyrene, alpha-methyl-p-methylstyrene, p-isopropylstyrene, vinyl naphthalene, acenaphthalene, vinyl anthracene, indene, p-cyanostyrene and the like. Mixtures of the vinylaromatic monomers can be employed, and it is currently preferred that the copolymer contain at least 50 weight percent styrene.

The copolymers can be prepared by any of the known processes typically employed for the free radical polymerization of vinylaromatic monomers, including mass, solution, suspension, emulsion, or combinations thereof, to obtain particles in the form of beads or pellets. Such polymer particles typically have average particle diameter sizes in the range from 0.2 to 6 mm. A method for obtaining expandable thermoplastic polymer particles containing a volatile fluid forming agent is described in Morehouse Jr. et al U.S. Pat. No. 3,615,972 which discloses the preparation of expandable microspheres by a suspension-type polymerization of droplets of a mixture of monomer and blowing agent.

The expanding agents which are employed in the present invention preferably include aliphatic hydrocarbons such as propane, butane, isobutane, pentane, neopentane, isopentane, hexane and butadiene, aliphatic cyclic hydrocarbons such as cyclobutane, cyclopentane and cyclohexane and halogenated hydrocarbons such a methylchloride, methylene chloride, dichlorofluoromethane, chlorotrifluoromethane, dichlorodifluoromethane, chlorodifluoromethane and trichlorofluoromethane. Particularly preferred ar those halogenated hydrocarbons which are not fully halogenated. The expanding agents are impregnated into the polymer particles in an amount of from 1 to 25 percent, preferably 5 to 20 percent, by weight of the acrylonitrile-based polymer particles. Currently, pentane and 1-chloro-1,1-difluoroethane is the preferred blowing agent mixture.

The binding agents which comprise the intermediate coating which is directly applied to the exposed surfaces of the expandable polymeric beads can include substantially any liquid aliphatic or aromatic organic material which is a nonsolvent for and substantially inert to the copolymeric particles and has a viscosity in the range from about 3 to about 50,000 centipoises at room temperature, preferably from about 3 to about 6,000 centipoises at room temperature. Preferred binding agents include polyether polyols, polyester polyols and monomeric polyols such as glycerine, erythritol and pentaerythritol, with polyether glycols having at least two hydroxyl groups and a viscosity in the range from about 3 to 2,000 centipoises at room temperature, and glycerine being preferred. The binding agents are applied or coated onto the surface of the expandable acrylonitrile-based resin at a level in the range from 0.2 to 1.2, preferably 0.3 to 0.6 weight percent based on weight of virgin expandable copolymer beads. The binder coating is applied to the surface of the expandable copolymer pellets by conventional means, with a tumble blender being the currently preferred method of application.

The magnesium oxide which is applied to the binder agent coated pellets is a particulate magnesium oxide powder. Preferably the magnesium oxide will have a particle size not greater than 200 mesh, with a 325 mesh powder being currently preferred. The magnesium oxide is employed in the range from 0.2 to 1.5 percent, preferably 0.2 to 1.2 and most preferably between 0.2 and 0.6 weight percent, based on the weight of the expandable copolymer beads. The magnesium oxide is applied to the binder agent-coated pellets by conventional means, with a tumble blender being the currently preferred method of application.

The following examples illustrate the advantages of the invention and should not be construed to limit its scope. In these examples, all amounts are in parts by weight (PBW), unless otherwise indicated.

EXAMPLE 1

Expandable styrene-acrylonitrile beads containing 25 weight percent acrylonitrile having incorporated therein 15 weight percent monochlorotrifluoromethane blowing agent were charged to a tumble blender and sequentially coated with a binding agent and a separation coating. The binding agent was polyethylene glycol having a 400 molecular weight and a viscosity of 3 centipoises at room temperature. The separation coatings were calcium stearate, magnesium carbonate and magnesium oxide. The magnesium oxide particles were sized through a 325 mesh.

Forty grams of each of the resulting coated expandable bead formulations were expanded for 6 minutes in a standard mini-pot, and the extent of clumping after expansion noted. The formulations and clumping results were as follows:

| Formulation | 2-1 | 2-2 | 2-3 |
|---|---|---|---|
| Expandable beads | 100 | 100 | 100 |
| Polyethylene glycol | 0.8 | 0.8 | 0.8 |
| Calcium stearate | 0.8 | — | — |
| Magnesium carbonate | — | 0.8 | — |
| Magnesium oxide | — | — | 0.8 |
| Clumping, % | 60 | 40 | 0 |

EXAMPLE 2

Following the procedure of Example 1, expandable styrene-acrylonitrile beads having an acrylonitrile content of 25 weight percent and containing 19 weight percent monochlorotrifluoromethane blowing agent were sequentially coated with the polyethylene glycol employed in Example 1 and then with calcium stearate, magnesium carbonate and magnesium oxide. Forty grams of the coated product were expanded in a standard mini-pot for 3 minutes. After expansion, the expanded materials were removed from the pot and evaluated for clumping. The formulations and clumping results were as follows:

| Formulation | 3-1 | 3-2 | 3-3 |
|---|---|---|---|
| Expandable beads | 100 | 100 | 100 |
| Polyethylene glycol | 0.4 | 0.4 | 0.4 |
| Calcium stearate | 0.4 | — | — |
| Magnesium carbonate | — | 0.4 | — |
| Magnesium oxide | — | — | 0.4 |
| Clumping, % | 80 | 10 | 0 |

EXAMPLE 3

Expandable polymer beads such as those employed in Example 1 were coated sequentially with polyethylene glycol (same as used in Example 1) and then with calcium stearate, magnesium oxide and a mixture of calcium stearate and magnesium oxide. Forty, fifty and fifty gram portions of the coated product were expanded in a standard mini-pot for 3 minutes, 3 minutes and 5 minutes, respectively. After expansion, the expanded materials were removed from the pot and evaluated for clumping. The formulations and clumping results were as follows:

| Formulation | Expandable beads | Polyethylene glycol | Calcium stearate | MgO |
|---|---|---|---|---|
| 4-1 | 100 | 0.4 | — | 0.4 |

-continued

|  | | | | | | |
|---|---|---|---|---|---|---|
| 4-2 | | 100 | | 0.4 | — | 0.2 |
| 4-3 | | 100 | | 0.2 | — | 0.1 |
| 4-4 | | 100 | | 0.3 | — | 0.2 |
| 4-5 | | 100 | | 0.2 | 0.1 | 0.1 |
| 4-6 | | 100 | | 0.3 | 0.1 | 0.2 |
| 4-7 | | 100 | | 0.2 | 0.05 | 0.05 |
| 4-8 | | 100 | | 0.3 | 0.2 | 0.1 |
| 4-9 | | 100 | | 0.2 | 0.1 | — |

| Clumping, % | 4-1 | 4-2 | 4-3 | 4-4 | 4-5 | 4-6 | 4-7 | 4-8 | 4-9 |
|---|---|---|---|---|---|---|---|---|---|
| 40 g/3 min | 0 | 0 | 0 | 0 | 1–5* | 0 | 0 | 0 | — |
| 50 g/3 min | 0 | 5–10* | 5–10* | 10* | 5–10* | 5–10* | 1–5* | 5–10* | 80 |
| 50 g/5 min | 20* | 50 | 90 | 50 | 50 | 40 | 80 | 90 | 100 |

*fused particles easily separated

The effect of the type of coating on the expandable polymer beads can be seen in the following tabulation of clumping evaluation results for the 50 grams of product expanded for 5 minutes:

| Formulation | Magnesium oxide, % | Calcium stearate, % | Polyethylene glycol, % | Clumping, % |
|---|---|---|---|---|
| 9 | 0.0 | 0.1 | 0.2 | 100 |
| 7 | 0.05 | 0.05 | 0.2 | 80 |
| 5 | 0.1 | 0.1 | 0.2 | 50 |
| 8 | 0.1 | 0.2 | 0.3 | 90 |
| 6 | 0.2 | 0.1 | 0.3 | 40 |
| 3 | 0.1 | 0.0 | 0.2 | 90 |
| 4 | 0.2 | 0.0 | 0.3 | 50 |
| 2 | 0.2 | 0.0 | 0.4 | 50 |
| 1 | 0.4 | 0.0 | 0.4 | 20 |

EXAMPLE 4

Expandable polymer beads such as those employed in Example 1 were coated sequentially with either polyethylene glycol (as used in Example 1) or glycerine and then coated with calcium stearate, magnesium carbonate or magnesium oxide. Forty grams of each product were expanded in a mini-pot for 3 minutes. The expanded materials were removed from the pot and evaluated for clumping. The formulations and clumping results were as follows:

| Formulation | EPB[a] | PEG[b] | GLY[c] | CaSt[d] | MgCo$_3$[e] | MgO[f] | Clumping, % |
|---|---|---|---|---|---|---|---|
| 5-1 | 100 | 0.4 | — | 0.2 | — | — | 80 |
| 5-2 | 100 | 0.4 | — | 0.4 | — | — | 75 |
| 5-3 | 100 | 0.6 | — | 0.6 | — | — | 66 |
| 5-4 | 100 | 0.8 | — | 0.6 | — | — | 27 |
| 5-5 | 100 | — | 0.4 | 0.4 | — | — | 0–5 |
| 5-6 | 100 | — | 0.6 | 0.6 | — | — | 13 |
| 5-7 | 100 | 0.6 | — | — | 0.6 | — | 75 |
| 5-8 | 100 | 0.8 | — | — | 0.8 | — | 40 |
| 5-9 | 100 | — | 0.6 | — | 0.6 | — | 0–5 |
| 5-10 | 100 | — | 0.4 | — | 0.4 | — | 5–10 |
| 5-11 | 100 | — | 0.6 | — | — | 0.6 | 0 |
| 5-12 | 100 | — | 0.4 | — | — | 0.4 | 0 |
| 5-13 | 100 | 0.4 | — | — | — | 0.4 | 0 |
| 5-14 | 100 | 0.6 | — | — | — | 0.6 | 0 |

[a]expandable beads;
[b]polyethylene glycol;
[c]glycerine;
[d]calcium stearate;
[e]magnesium carbonate;
[f]magnesium oxide The mini-pot which was employed as the expansion chamber in the examples was a 20-qt. stock pot equipped with a steamer basket supported from the bottom of the pot. A water level was maintained below the bottom of the steamer basket. The basket is charged with the indicated amount of expandable beads and the pot is covered. The water is heated to create a steam environment in the pot interior to expand the beads.

The data demonstrate that coating of expandable vinylaromatic-acrylonitrile copolymer beads with magnesium oxide surprisingly substantially reduces, if not entirely eliminates, clumping or fusion of the beads during expansion. During these experiments, it was found that a 40 gram or 50 gram, preferably the latter, charge was more duplicative of actual field expansion chamber performance.

The data of Examples 1 and 2 demonstrates the surprising results of the invention and are self-explanatory. The data of Example 3 demonstrates that 0.2 or preferably more weight percent of magnesium oxide is required for an effective coating, c.f. formulations 4-1 to 4-4, inclusive. The data of Example 3 further shows the ineffectiveness of calcium stearate alone (formulation 4-9) and the beneficial effect of magnesium oxide as an anti-clump coating. Example 4 data confirms the surprising effect of coating expandable vinylaromatic-acrylonitrile copolymer beads with magnesium oxide.

It is understood that the above is merely representative of the preferred embodiment and that various changes can be made without departing from the spirit and broader aspects of the invention.

What is claimed is:

1. The method for reducing clumping together of expandable vinylaromatic-acrylonitrile copolymer particles comprising coating the exposed surfaces of said particles with particulate magnesium oxide in an amount in the range from 0.2 to 1.5 weight percent, based on the weight of expandable copolymer particles.

2. A method in accordance with claim 1 wherein said expandable copolymer particles are coated with from 0.2 to 1.2 percent by weight, based on weight of expandable copolymer particles, of at least one binding agent comprising a fluid organic compound which is a nonsolvent for and inert to said copolymer particles, said binding agent having a viscosity in the range from 3 to 50,000 centipoises at room temperature, prior to being coated with magnesium oxide.

3. A method in accordance with claim 2 wherein the amount of magnesium oxide is in the range from 0.2 to 0.6 weight percent.

4. A method in accordance with claim 2 wherein said expandable copolymer comprises from 20 to 40 weight percent acrylonitrile.

5. A method in accordance with claim 4 wherein said vinylaromatic monomer comprises styrene.

6. A method in accordance with claim 2 wherein said bonding agent is selective from the group consisting of polyether polyols, polyester polyols, glycerine, erythritol, pentaerythritol, and mixtures thereof.

7. A method in accordance with claim 6 wherein said bonding agent is selective from the group consisting of polyether glycols having at least two hydroxyl groups and a viscisity in the range from about 3 to 2,000 centipoises at room temperature.

8. A method in accordance with claim 7 wherein said bonding agent comprises of glycerine.

9. A method in accordance with claim 8 wherein said expandable copolymer comprises a styrene-acrylonitrile copolymer.

10. A method in accordance with claim 9 wherein said expandable styrene-acrylonitrile copolymer comprises from 20 to 40 weight percent acrylonitrile.

* * * * *